United States Patent [19]
Gielda et al.

[11] Patent Number: 5,626,185
[45] Date of Patent: *May 6, 1997

[54] AIRFLOW EJECTOR SYSTEM FOR AN AUTOMOTIVE VEHICLE WITH WHEEL-WELL EJECTORS

[75] Inventors: Thomas P. Gielda, Brighton; Christopher M. Greiner, Birmingham; Mark Q. Haddlesey, Livonia, all of Mich.

[73] Assignee: Ford Motor Company, Dearborn, Mich.

[*] Notice: The term of this patent shall not extend beyond the expiration date of Pat. No. 5,526,872.

[21] Appl. No.: 270,537

[22] Filed: Jul. 5, 1994

[51] Int. Cl.⁶ .......................... B60K 11/00; B60K 11/02; B62D 35/02
[52] U.S. Cl. .................. 165/41; 165/51; 165/121; 165/122; 180/68.1; 123/41.49; 296/180.1
[58] Field of Search .................. 165/41, 44, 51, 165/121, 122; 180/68.1, 68.2; 123/41, 49; 296, 180.1

[56] References Cited

U.S. PATENT DOCUMENTS

| | | |
|---|---|---|
| 2,913,065 | 11/1959 | Lyon, Jr. . |
| 3,205,964 | 9/1965 | Henry-Biabaud . |
| 3,937,192 | 2/1976 | Longhouse . |
| 4,181,172 | 1/1980 | Longhouse . |
| 4,549,762 | 10/1985 | Burk et al. .................. 180/68.1 |
| 5,046,554 | 9/1991 | Iwasaki et al. . |
| 5,526,872 | 6/1996 | Gielda et al. .................. 165/41 |

FOREIGN PATENT DOCUMENTS

| | | |
|---|---|---|
| 64139 | 3/1914 | Austria . |
| 60657 | 2/1943 | Denmark . |
| 0192934 | 3/1986 | European Pat. Off. . |
| 0191012 | 8/1986 | European Pat. Off. . |
| 4243593 | 7/1913 | Germany . |
| 2912386 | 10/1980 | Germany . |
| 3412607 | 10/1985 | Germany . |
| 3704145 | 8/1988 | Germany . |
| 3630645 | 10/1988 | Germany . |
| 550820 | 11/1956 | Italy . |
| 5-131849 | 5/1993 | Japan . |
| 1516413 | 10/1989 | U.S.S.R. .................. 180/68.2 |
| 2051691 | 1/1981 | United Kingdom . |
| 2189199 | 10/1987 | United Kingdom . |

*Primary Examiner*—John K. Ford
*Attorney, Agent, or Firm*—Raymond L. Coppiellie

[57] ABSTRACT

A cooling system for an automotive vehicle is disclosed including a heat exchanger assembly, a rotatable axial flow fan and a shroud member at least partially surrounding the fan and the heat exchanger assembly. The cooling system further includes a first ejector disposed between the heat exchanger and the engine and a pair of second ejectors disposed on the inner fender members of the vehicle for drawing ambient air from under the heat exchanger and pumping the air toward the engine and for preventing recirculation of the air exiting the shroud member back to the fan while the vehicle is at idle.

5 Claims, 4 Drawing Sheets

AIRFLOW EJECTOR SYSTEM FOR AN AUTOMOTIVE VEHICLE WITH WHEEL-WELL EJECTORS

BACKGROUND OF THE INVENTION

1. Field of the Invention

The present invention relates generally to a cooling system for cooling an engine of an automotive vehicle. More particularly, the present invention relates to an ejector system used in an automotive cooling system which substantially reduces recirculation of air into the fan of the cooling system.

2. Disclosure Information

Most vehicles used today are propelled by internal combustion engines and such engines, as is well known, generate heat during their operation. For the most part, the internal combustion engines employed commercially are of the liquid-cooled type which employs the circulation of a coolant through the engine for absorbing heat. The correct operating temperature of the engine is maintained by subsequently passing, under pressure, the heated coolant received from the engine through a heat exchanger system and returning the coolant to the engine for recirculation therein. Generally, the heat exchange system employed includes a heat exchanger or a radiator and condenser assembly through which the heated coolant received from the engine flows. Simultaneously, the fan disposed between the radiator and the engine draws ambient air through the radiator which absorbs the heat from the heated coolant and carries it to the atmosphere. In most vehicle applications, the air stream formed by the fan is discharged back over the engine after passing through the radiator. This engine fan exhaust impinges on the engine block of the vehicle engine and is turned approximately 90° downward. This hot exhaust air then impacts the ground and a portion of the fan exhaust is redirected toward the front of the vehicle where the hot air flow is subsequently reingested into the front-end air stream. This recirculation results in increased engine coolant air inlet temperatures and subsequently increased air conditioning head pressure. This is particularly a problem when the vehicle is at idle in hot regions.

Various devices have been proposed to reduce or eliminate the hot air recirculating back to the front end intake of the vehicle. For example, U.S. Pat. No. 4,173,995 discloses a recirculation barrier for a heat transfer system for an automotive vehicle. The patent teaches eliminating air flow recirculation in the fan shroud-hub region of the vehicle by contouring the fan shroud and installing a deflection plate which turns the flow of air from an axial to a radial direction, thereby reducing the amount of air flow recirculating in the fan shroud region. By reducing the amount of recirculation in the fan shroud, the fan operates more efficiently and more cooling air is pulled through the fan/radiator. This system does not disclose the use of an ejector for reducing the amount of recirculation of the hot air into the fan intake.

Ejectors have been utilized in the aerospace industry to increase engine thrust by increasing primary and bypass air stream mixing. Heretofore, however, an ejector has never been utilized in the automotive environment for reducing air flow recirculation, particularly when an automotive vehicle is at idle conditions. It is, therefore, an object of the present invention to reduce the air conditioning head pressure during idle condition by decreasing engine air flow recirculation without effecting engine cooling performance.

SUMMARY OF THE INVENTION

The present invention provides a cooling system for cooling an engine disposed in an engine compartment of an automotive vehicle, the vehicle including a pair of front steerable wheels and a pair of inner fender members, each one of the pair of inner fender members being interposed between one of the wheels and the engine. The cooling system comprises a radiator disposed in the engine compartment of the vehicle and secured therein by support members; a rotatable axial flow fan having a plurality of circumferentially spaced impeller blades extending radially from a hub and disposed on one side of the radiator; and a shroud member at least partially surrounding the fan and the radiator. The shroud member directs the flow of air through the radiator and into the engine compartment and is disposed a predetermined distance from the engine to define a reference area of predetermined size therebetween. The system further comprises a pair of ejectors, each one of the pair being disposed on an inner fender member proximate a steerable vehicle front wheel, each of the ejectors being operative to direct the flow of air from the engine compartment toward the rear of the vehicle while the vehicle is stationary.

In one embodiment, the system further includes an additional, or lower ejector disposed between the radiator and the engine. The lower ejector draws ambient air from under the radiator and pumps the air toward the engine and minimizes recirculation of air exiting the shroud member back to aid fan while the vehicle is stationary.

It is an advantage of the present invention to provide a simple, passive device to redirect the flow of underhood air to the aft end of the vehicle by drawing cooler free stream air from the front of the vehicle into the underbody region, especially while the vehicle is at idle. In doing so, the ejector system of the present invention reduces the power requirements of the vehicle by decreasing the amount of time the vehicle is operating in a high speed fan mode. These and other objects, features and advantages of the present invention will become apparent from the drawings, detailed description and claims which follow.

DETAILED DESCRIPTION OF THE PREFERRED EMBODIMENTS

Figure 1:
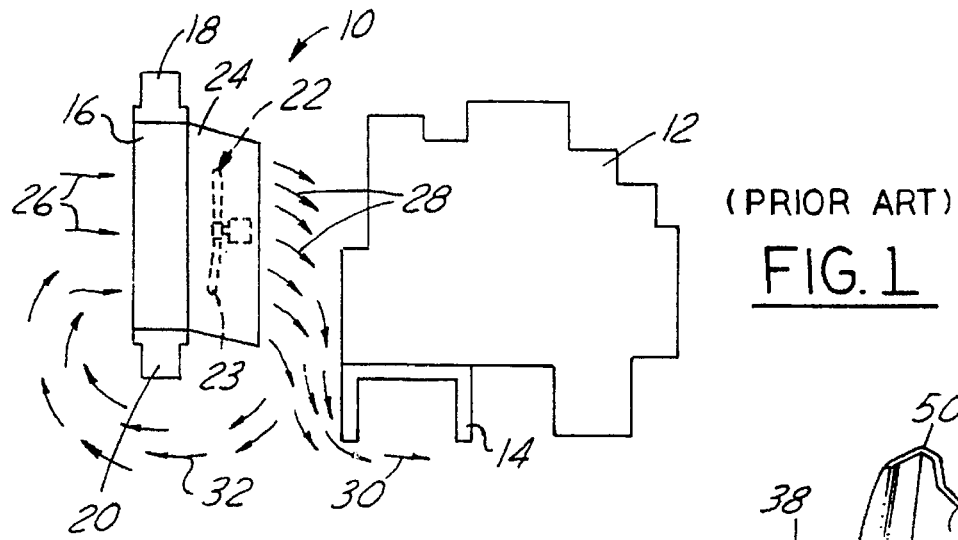
FIG. 1 is a schematic drawing indicating air flow paths through an automotive vehicle engine compartment without an ejector while the vehicle is at idle condition.

Referring now to the drawings wherein like reference numerals represent like elements throughout the various views. FIG. 1 shows a known engine compartment of an automotive vehicle. The engine compartment 10 houses an automotive engine 12 supported therein by engine supports 14 mounted to a portion of the vehicle frame. The vehicle further includes a heat exchanger assembly, such as a radiator 16 mounted by upper support members 18 and lower support members 20 to the interior of the engine compartment 10. A rotatable, axial flow fan 22 is disposed adjacent the radiator 16. As is well known in the art, the fan 22 includes a plurality of circumferentially spaced impeller blades 23 extending radially from a hub. As is well known in the art, water or engine coolant flows between the radiator 16 and the engine 12 through a pair of fluid conduits such as hoses (not shown). The fan 22, typically driven by a conventional belt and pulley combination, pulls ambient air through the radiator 16 to provide for cooling the fluid passing between the radiator and the engine. A fan shroud member 24 surrounds the fan 22 and directs the flow of air through the radiator 16 toward the engine 12.

FIG. 1 further shows the air flow through the engine compartment and cooling system of the vehicle. As shown therein, ambient air 26 is pulled through radiators 16 by fan 22 and directed toward engine 12 by fan shroud member 24. Upon exiting the fan shroud, the air stream 28 impinges the engine 12 and is directed 90° downward where it contacts the surface upon which the vehicle is sitting. At this point, a portion of the air stream is directed toward the aft end of the vehicle (as indicated by numeral 30). However, a portion of this air stream is directed toward the front end of the vehicle (as indicated at 32) and is eventually recirculated into the ambient air 26 entering the vehicle radiator 16. Drawing in air at this elevated temperature raises the heat exchanger inlet temperature, resulting in an increase in the head pressure in the compressor of the air conditioning system. If the head pressure of the compressor builds up past a predetermined threshold, the compressor will fail, particularly while the vehicle is at idle. As described above, this is particularly a problem in the hot regions of the country.

Figure 2:
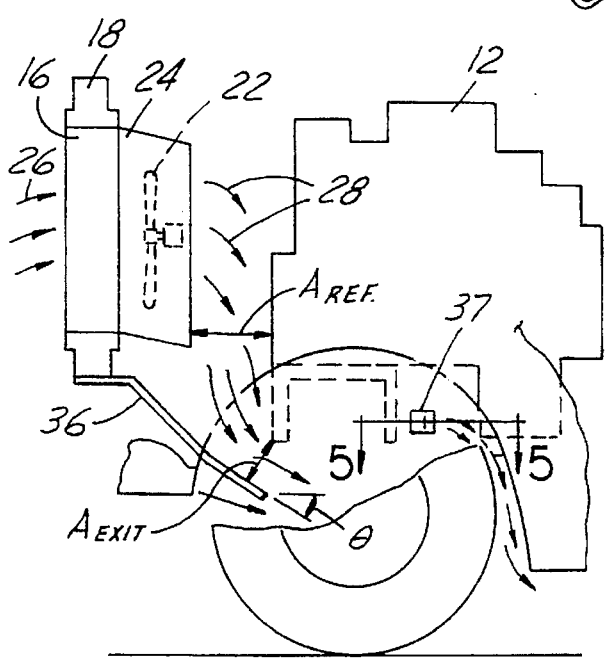
FIG. 2 is a schematic drawing indicating the air flow path through an automotive engine compartment having an ejector system structured in accord with the principles of the present invention.

FIG. 2 shows a schematic, side view of an engine compartment similar to FIG. 1 but including an ejector system according to the present invention. As shown therein, the ambient incoming air 26 passes through radiator 16 and fan shroud member 24 and exits the fan shroud at 28. The exiting air 28 impinges the vehicle engine 12 as before and is directed 90° downward. A plurality of airflow ejectors are placed within the engine compartment of the vehicle. A first, or lower ejector 36 is mounted at one end to the lower radiator support brackets and extends toward and slightly under the vehicle engine 12. A pair of second, or fender ejectors 37 are secured to the inner fender member of the vehicle body as will be described in greater detail below. (Only one ejector 37 is illustrated, it being understood that a second fender ejector is disposed symmetrically on the opposite inner fender member.) As shown in FIG. 2, because of the placement and operation of ejectors 36, 37, the exiting air 28 is directed substantially all to the rear of the vehicle as shown at 30. This is because the ejectors 36, 37 draw ambient air from under the radiator assembly 16 and pump this ambient air toward the engine 12 of the vehicle. By pumping this air away from under the radiator assembly 16, the ejectors 36, 37 minimize recirculation of the air 28 exiting the shroud member 24 back to the fan while the vehicle is stationary. Ejector 37 also redirects engine cooling air which would otherwise flow forward out of the front wheelwells to the rear of the vehicle. No other typical prior art recirculation shields discussed above causes the ambient air to flow from under the radiator assembly 16 and pumps this air toward the rear end of the vehicle while the vehicle is stationary. As such, the recirculation of air is greatly reduced, thereby reducing the inlet temperature of the heat exchange assembly and reducing the air conditioning head pressure as will be shown in greater detail below.

Figure 3:
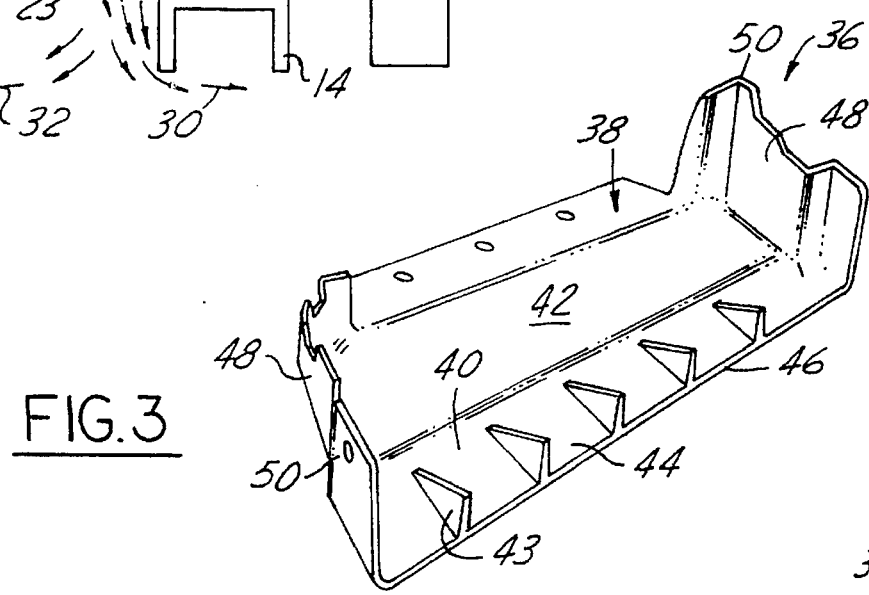
FIG. 3 is a perspective view of one ejector structured in accord with the principles of the present invention.

FIG. 3 shows a perspective view of the lower ejector 36 of the present invention. The ejector 36 comprises a web 38 of material, the web including a first portion 40 and a second portion 42. As shown more clearly in FIG. 2, the first portion 40 of the web is inclined at a predetermined angle ($\theta$) relative to the plane of the surface upon which the vehicle is disposed. Typically, Theta ($\theta$) is less than 35°, and in the preferred embodiment ranges between 10°–25°. It is this angle Theta ($\theta$) which is a critical feature of the present invention since if Theta ($\theta$) is too large, then the air exiting the fan shroud 28 can recirculate back to the radiator 16 and thus increase the inlet temperature thereat. This will be shown and described later.

In the preferred embodiment, the first portion 40 includes a plurality of tab members 43 spaced equidistantly along the trailing edge 46. The number of tab members 43 will vary depending on the application used and airflow characteristics to be achieved. Each of the tab members 43 is generally triangularly shaped, although each tab member may have any other suitable shape. The tab members 43 increase the strength of the underbody entrainment flowfield as well as reduce the aerodynamic drag of the ejector 36. As can be seen in FIG. 3, each of the tab members 43 has an optimized height/length ratio (y/x), that being 0.5 in the preferred embodiment. However, that ratio can range from between 0.30 to 0.75. This enhances the underbody airstream mixing and engine cooling. Alternatively, the trailing edge could include a corrugated cross-section having a plurality of crests and valleys. These crests and valleys create further air turbulence and mixing of air to create a greater entrained flow of ambient air from under the radiator assembly 16.

The exit end 44 of the first portion 40 of web 38 defines a trailing edge 46 thereat. The thickness of the trailing edge 46 should be minimized to promote mixing in turbulence of the exit air passing therepast. The trailing edge of the ejector must extend below the lowest structural member in a near downstream region, such as at the engine support 14. If the trailing edge is located above the support, the effect of ejector exiting will be increased resulting in increased air flow recirculation.

The second portion 42 of the web 38 of lower ejector 36 includes a pair of generally vertical walls 48 disposed at the longitudinal edges thereof. The walls include a plurality of apertures 50 which receive a fastener therethrough to connect the ejector to the lower radiator support member 20. Alternatively, the ejector 36 could be fastened to any frame member or engine compartment member of the vehicle.

Figure 4:
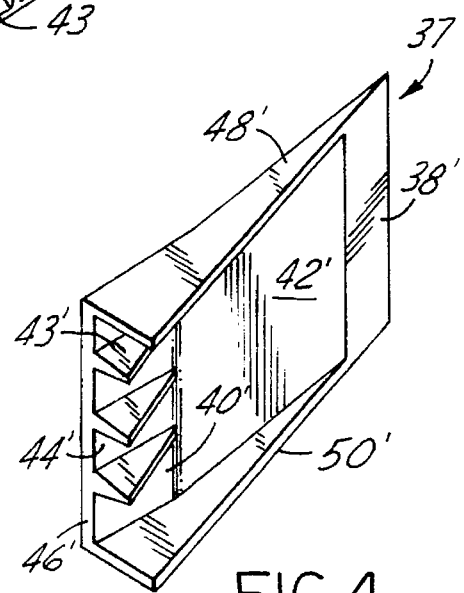
FIG. 4 is a perspective view of a second ejector structured in accord with the principles of the present invention.

FIG. 4 shows a perspective view of the fender ejector 37 of the present invention. As can be seen, ejector 37 is essentially configured the same as ejector 36, although slightly smaller. A detailed description of its components is therefore unnecessary. The fender ejector 37 comprises a web 38' of material, the web including a first portion 40' and a second portion 42'. As described above with reference to ejector 36, the first portion 40' of the web is inclined at a predetermined angle ($\theta$) relative to the plane of the inner fender surface.

Ejector 37 also includes a plurality of tab members 43' generally identical to those described above except for size and which are spaced equidistantly along the trailing edge 46'. The number of tab members 43' will vary depending on the application used and airflow characteristics to be achieved. Alternatively, the trailing edge could include a corrugated cross-section having a plurality of crests and valleys. These crests and valleys create further air turbulence and mixing of air to create a greater entrained flow of ambient air from under the radiator assembly 16.

Figure 5:
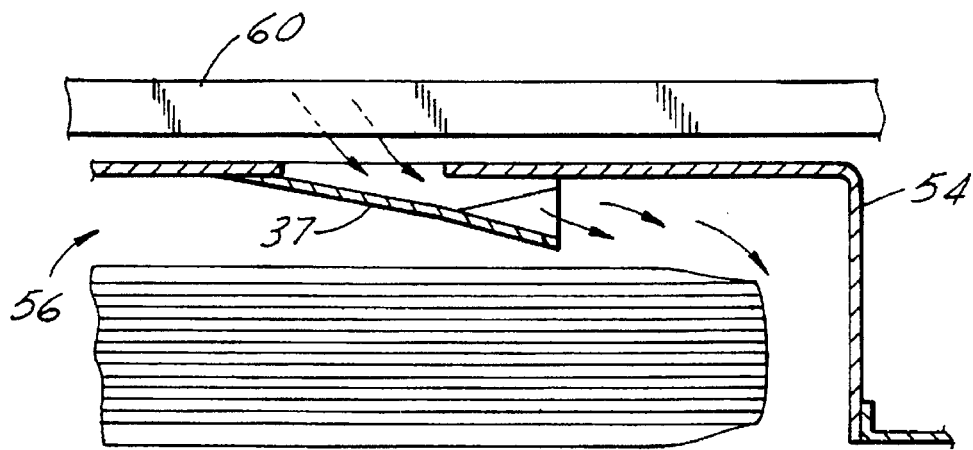
FIG. 5 is a cross-sectional view of an ejector of the present invention taken along line 5—5 of FIG. 2.

As shown in FIG. 5, the fender ejector 37 is secured to an inner fender 54 of the vehicle body in the area behind the front wheels commonly known as the wheelwell 56. Typically in most automotive vehicles, a small gap exists between the frame rail 60 and the inner fender 54 through which heated engine compartment air escapes. This heated air often recirculates to the front of the vehicle as described above. By employing the fender ejector 37 at either both or just a single wheelwell, this heated air is directed away from the front of the vehicle, a desirable effect to decrease exhaust recirculation.

Referring back to FIG. 2, another critical dimension of the lower ejector 36 is the ratio of the exit area of the ejector to the area between the fan shroud 24 and the vehicle engine 12. The fan shroud 24 is disposed a predetermined distance from the engine 12 and this distance can be computed into an area denoted by $A_{ref}$ in FIG. 2. The exit end 44 of the ejector 36 is located a predetermined distance from the vehicle engine 12 or the engine support 14 as denoted by $A_{exit}$ in FIG. 2. The ratio of this exit area to the reference area, $A_{exit}/A_{ref}$ is critical in determining the design and location of the ejector 36 to optimize the reduction in air flow recirculation. For example, it has been determined that the ratio of the exit area to the reference area should be greater than 0.5 to achieve optimum benefits of the ejector 36 as will be shown later with reference to FIG. 7 below.

Figure 6:
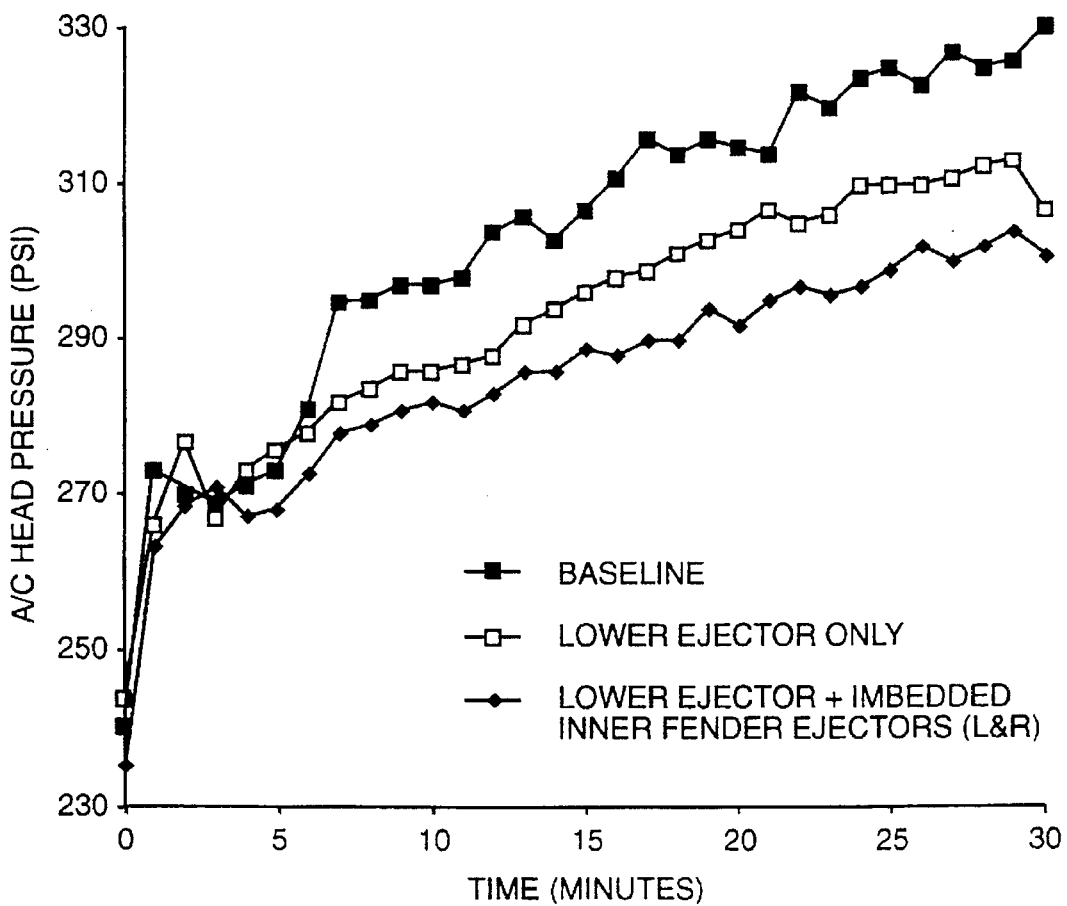
FIG. 6 is a plot diagram of air conditioning head pressure versus time comparing a vehicle having no ejectors to a vehicle with an ejector system of the present invention.
Figure 7:
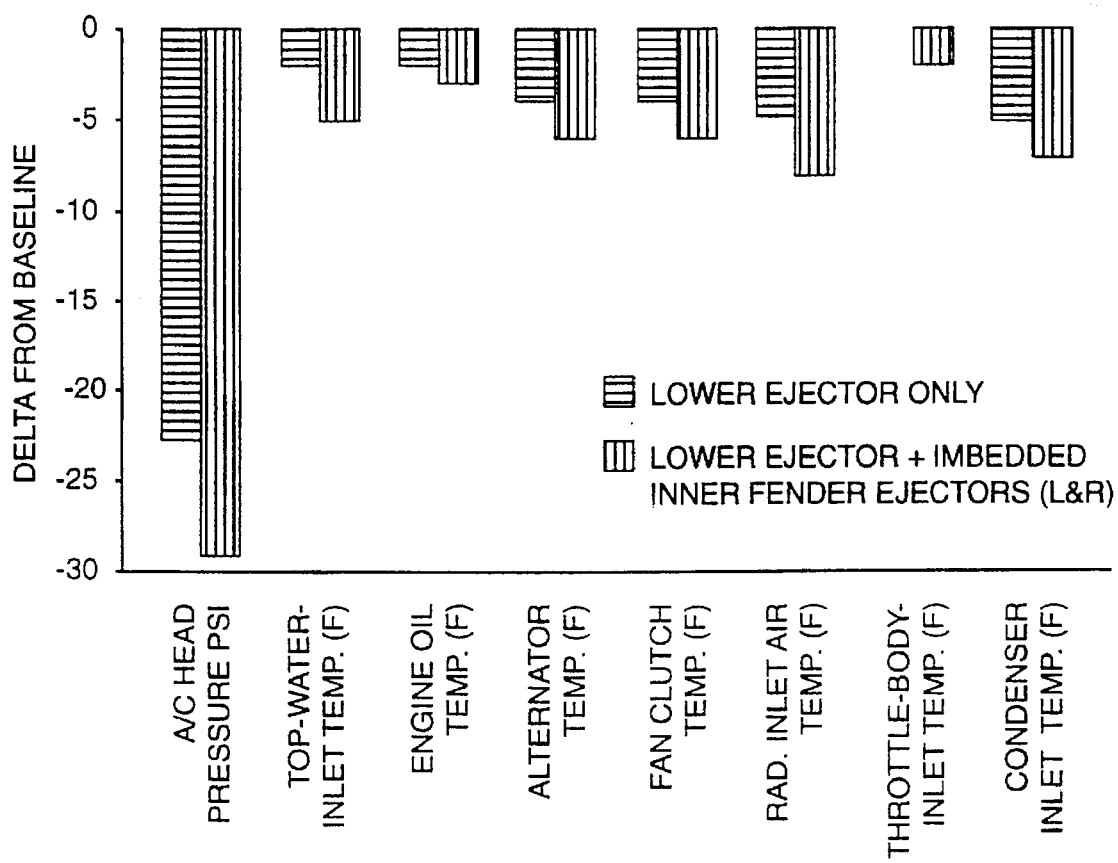
FIG. 7 is a graphical diagram comparing the temperature change of various vehicle parameters for a vehicle having an ejector system of the present invention.

FIGS. 6 and 7 show a comparison of the operation of a vehicle with no ejectors ("baseline") to a vehicle having only the lower ejector 36 and to a vehicle having both a lower ejector 36 and two fender ejectors 37. FIG. 6 depicts the comparison relative to air conditioning head pressure. FIG. 7 depicts the comparison on many temperature measurements within the engine compartment, including top water inlet temperature, engine oil temperature, alternator temperature, fan clutch temperature, radiator inlet air temperature, throttle body inlet temperature, and condenser inlet temperature.

FIG. 6 shows that the air conditioning head pressure is substantially decreased using the ejectors of the present invention after the vehicle has been idling for 30 minutes. A difference of approximately 23 psi exists after a 30 minute idle condition for a vehicle employing the lower ejector 36 only and approximately 29 psi decrease for a vehicle employing both ejectors 36, 37. These are substantial reductions in the air conditioning head pressure. FIG. 7 shows the beneficial effects of vehicles employing ejectors according t the present invention. The results are tabulated below:

| Measure Parameters | Difference from "Baseline" | |
|---|---|---|
| | Lower Ejector only | Both Ejectors |
| A/C Head Pressure | 23 psi | 29 psi |
| Top-water Inlet Temp. | 2 degrees F. | 5 degrees F. |
| Engine Oil Temp. | 2 degrees F. | 3 degrees F. |

| Measure Parameters | Difference from "Baseline" | |
|---|---|---|
| | Lower Ejector only | Both Ejectors |
| Alternator Temp. | 4 degrees F. | 6 degrees F. |
| Fan Clutch Temp. | 4 degrees F. | 6 degrees F. |
| Radiator Inlet Temp. | 5 degrees F. | 7 degrees F. |
| Throttle Body Inlet Temp. | no change | 2 degrees F. |
| Condenser Inlet Temp. | 5 degrees F. | 7 degrees F. |

Figure 8:
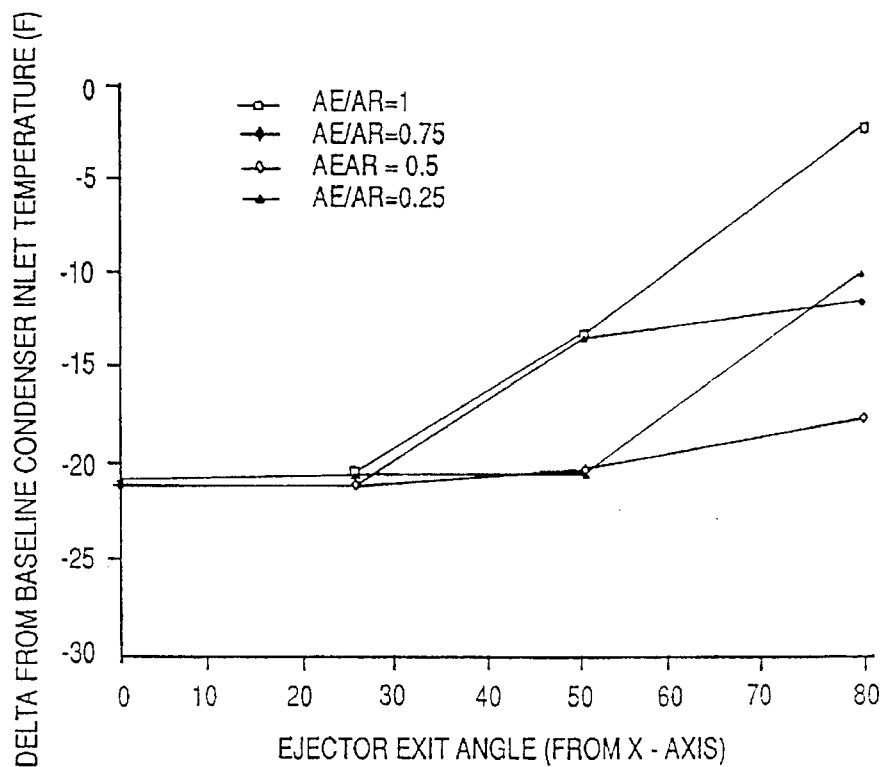
FIG. 8 is a plot diagram showing the effect of ejector exit angle on inlet temperature for a vehicle.

FIG. 8 shows a plot of the inlet temperature versus the ejector angle (Theta) formed by the exit end 44 of the ejector 36 relative to the plane upon which the vehicle is resting for a variety of ratios of exit area to reference area. As can be seen in FIG. 6, the values remain substantially constant until an exit angle of about 35°. At that point, the temperatures rise rapidly indicating that recirculation of the air gradually increases back to the heat exchanger of the vehicle. Therefore, it would be advantageous to provide an ejector exit angle of less than 35° to minimize the increase in inlet temperature to the heat exchanger of the cooling system.

Figure 9:
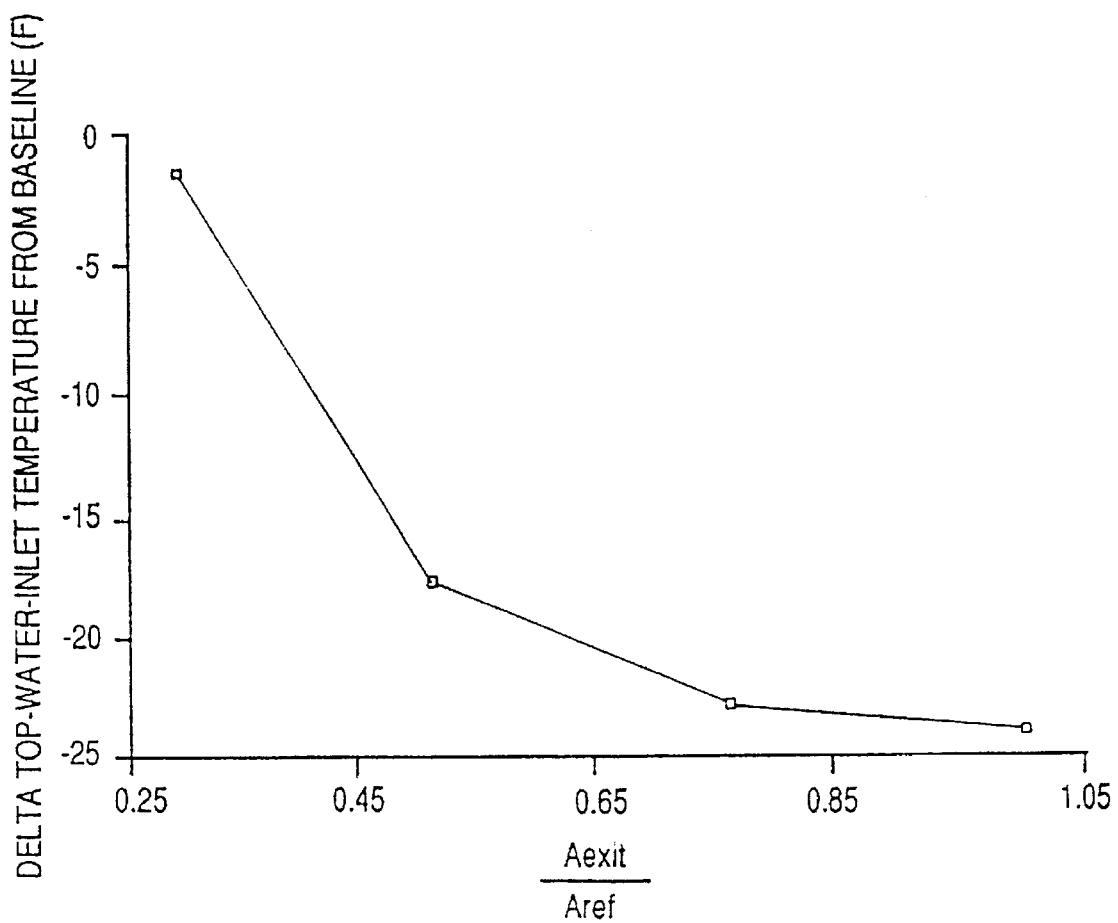
FIG. 9 is a plot diagram showing the effect of ejector exit area ratio on inlet temperature for an automotive vehicle.

As explained above, the ratio of the exit area, $A_{exit}$ to the reference area, $A_{ref}$ is important as well to the operation of the present invention. FIG. 9 plots the change in water inlet temperature versus the exit area ratio ($A_{exit}/A_{ref}$) for a specific vehicle application. As shown therein, the water inlet temperature substantially decreases at a ratio of approximately 0.50 and continues until it levels out at approximately a ratio of 1.0. Therefore, to optimize the reduction of air flow recirculation and decrease the change in inlet temperature, it is preferred to have an exit area ratio of greater than 0.5. Furthermore, packaging issues rarely allow the exit area ratio to be greater than 1.0. If the exit area ratio is too small, the ejector system will increase the static pressure in the engine compartment resulting in increased leakage and recirculation of the air stream. Hot engine air will blow forward into the condenser in-flow air stream via side spillage around the condenser or radiator supports.

By utilizing a passive ejector system according to the present invention, the amount of recirculation of air to the vehicle is greatly decreased. The ejector system decreases the fan power requirements of the vehicle by decreasing the underhood and underbody temperature of the vehicle, especially during idle and cruise conditions. This type of ejector system further decreases the vehicle sensitivity to tail-winds while the vehicle is idling and, therefore, represents a great benefit to the operation of the vehicle.

Various other modifications and alterations of the present invention should be apparent to those skilled in the art. For example, the ejectors can be fabricated from a metallic alloy or a synthetic polymeric material such as an ABS, a nylon or any other material achieving the same beneficial characteristics. The shape of the ejectors can take many forms depending upon the available package space and design of the vehicle and the present invention is not meant to be limited to a single shape. Therefore, it is the following claims, including all equivalents which define the scope of the invention.

What is claimed is:

1. A cooling system for cooling an engine disposed in an engine compartment of an automotive vehicle, the vehicle including a pair of front steerable wheels and a pair of inner fender members, each one of said pair of inner fender members being interposed between one of said wheels and said engine, the cooling system comprising:

a radiator disposed in the engine compartment of the vehicle and secured therein by support members;

a rotatable axial flow fan having a plurality of circumferentially spaced impeller blades extending radially from a hub and disposed on one side of said radiator;

a shroud member at least partially surrounding said fan and said radiator, said shroud member being operative to direct the flow of air through said radiator and into said engine compartment, said shroud member being disposed a predetermined distance from said engine to define a reference area of predetermined size therebetween; and a pair of ejectors, each one of said pair being disposed on an inner fender member proximate a steerable wheel, each of said ejectors being operative to direct the flow of air from said engine compartment toward the rear of said vehicle while said vehicle is stationary so as to create an underbody entrainment flowfield thereby and to prevent recirculation of air exiting the shroud member back to the fan, each of said ejectors comprising a web having a longitudinal and transverse axes and including a first portion inclined at an angle of less than 35 degrees relative to the plane of the inner fender member, a second portion connected to said inner fender member and a plurality of generally vertical tab members disposed on the first portion, said tab members having a height to length ratio of between 0.30–0.75.

2. A cooling system according to claim 1, further including a lower ejector disposed between said radiator and said engine, said lower ejector being operative to draw ambient air from under said radiator and pump said air toward said engine and to prevent recirculation of air exiting said shroud member back to aid fan while said vehicle is stationary.

3. A cooling system for cooling an engine of an automotive vehicle, the vehicle including a pair of front steerable wheels and a pair of inner fender members, each one of said pair of inner fender members being interposed between one of said wheels and said engine, the cooling system comprising:

a heat exchanger assembly disposed in an engine compartment of the vehicle and secured therein by support members;

a rotatable axial flow fan having a plurality of circumferentially spaced impeller blades extending radially from a hub and disposed adjacent said heat exchanger;

a shroud member at least partially surrounding said fan and said heat exchanger assembly, said shroud member being operative to direct the flow of air from said fan through said heat exchanger assembly and into said engine compartment said shroud member being disposed a predetermined distance from said engine to define a reference area of predetermined size therebetween; and ejector means disposed between said heat exchanger assembly and said engine for drawing ambient air from under said assembly and pumping said air toward said engine and for preventing recirculation of air exiting said shroud member back to said fan while said vehicle is stationary, said ejector means comprising:

a first ejector member disposed between said heat exchanger assembly and said engine, said first ejector comprising a first web having a longitudinal and horizontal axes and including a first portion inclined at a predetermined angle of less than 35 degrees relative to the plane of the surface upon which said vehicle is disposed, said first web further including a second portion connected to said vehicle adjacent said heat exchanger assembly, said first ejector further including an exit end proximate said vehicle engine and defining an exit area of predetermined magnitude between said exit end and said engine such that the ratio of said exit area to said reference area is greater than 0.50; and a pair of second ejector members, each one of said pair disposed on one of said pair of inner fender members, each one of said second ejectors comprising a second web having a longitudinal and transverse axes and including a first portion inclined at an angle of less than 35 degrees relative to the plane of the inner fender member and a second portion connected to said inner fender member.

4. A cooling system according to claim 3, wherein each of said ejectors is fabricated from a synthetic polymeric material.

5. A cooling system according to claim 3, wherein each of said ejectors further includes a plurality of tab members disposed on a trailing edge thereof.

* * * * *